United States Patent
Pathak et al.

(10) Patent No.: US 7,474,652 B2
(45) Date of Patent: *Jan. 6, 2009

(54) CACHING REMOTE SWITCH INFORMATION IN A FIBRE CHANNEL SWITCH

(75) Inventors: Lalit D. Pathak, San Jose, CA (US); Raymond C. Tsai, Cupertino, CA (US); Richard L. Hammons, Hollister, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1256 days.

This patent is subject to a terminal disclaimer.

(21) Appl. No.: 10/208,427

(22) Filed: Jul. 30, 2002

(65) Prior Publication Data

US 2004/0022254 A1    Feb. 5, 2004

(51) Int. Cl.
*H04L 12/28* (2006.01)
(52) U.S. Cl. ............... 370/389; 370/386; 370/254; 711/100; 709/220
(58) Field of Classification Search ............... None
See application file for complete search history.

(56) References Cited

U.S. PATENT DOCUMENTS

| | | | |
|---|---|---|---|
| 6,792,507 B2* | 9/2004 | Chiou et al. | 711/119 |
| 2003/0079019 A1* | 4/2003 | Lolayekar et al. | 709/226 |
| 2003/0187847 A1* | 10/2003 | Lubbers et al. | 707/9 |
| 2003/0189936 A1* | 10/2003 | Terrell et al. | 370/395.31 |
| 2004/0054866 A1* | 3/2004 | Blumenau et al. | 711/202 |

OTHER PUBLICATIONS

American National Standard of Accredited Standards Committee (NCITS); *Fibre Channel Fabric Loop Attachment (FC-FLA) REV 2.7*; (4 p.); Aug. 12, 1997. Only p. 1, 77-83.
American National Standard of Accredited Standards Committee (NCITS); *Fibre Channel Single-Byte Command Code Sets-2 Mapping Protocol (FC-SB-2) REV 2.1*; (2 p.); Dec. 6, 2000. Only p. 1, 26-28.
American National Standard of Accredited Standards committee (NCITS); *Fibre Channel Generic Services-4 (FC-GS-4) REV 7.2*; (35 p.); Jan. 22, 2002. Only p. 1, 30-95, 261-262.
American National Standard of Accredited Standards Committee (NCITS); *Fibre Channel Switch Fabric-3 (FC-SW-3) REV 6.0*; (11 p.); Jan. 24, 2002. Only p. 1, 140-155.
American National Standard of Accredited Standards Committee (NCITS); *Fibre Channel Framing And Signaling (FC-FS) REV 1.70*; (3 p.); Feb. 8, 2002. Only p. 1., 172-176.

* cited by examiner

*Primary Examiner*—Duc C Ho
(74) *Attorney, Agent, or Firm*—Conley Rose, P.C.

(57) ABSTRACT

A network of switches with a distributed name server configuration and caching of remote node device information is disclosed. The network preferably comprises a first switch coupled to a second switch. Each of the switches directly couple to respective node devices. The first switch maintains a name server database about its local node devices, as does the second switch. The second switch further maintains a information cache about remote node devices. The name server preferably notifies other switches of changes to the database, and the cache manager preferably uses the notifications from other switches to maintain the cache. The name server accesses the cache to respond to queries about remote node devices. The cache manager may also aggregate notification messages from other switches when notifying local devices of state changes. Traffic overhead and peak traffic loads may advantageously be reduced.

25 Claims, 4 Drawing Sheets

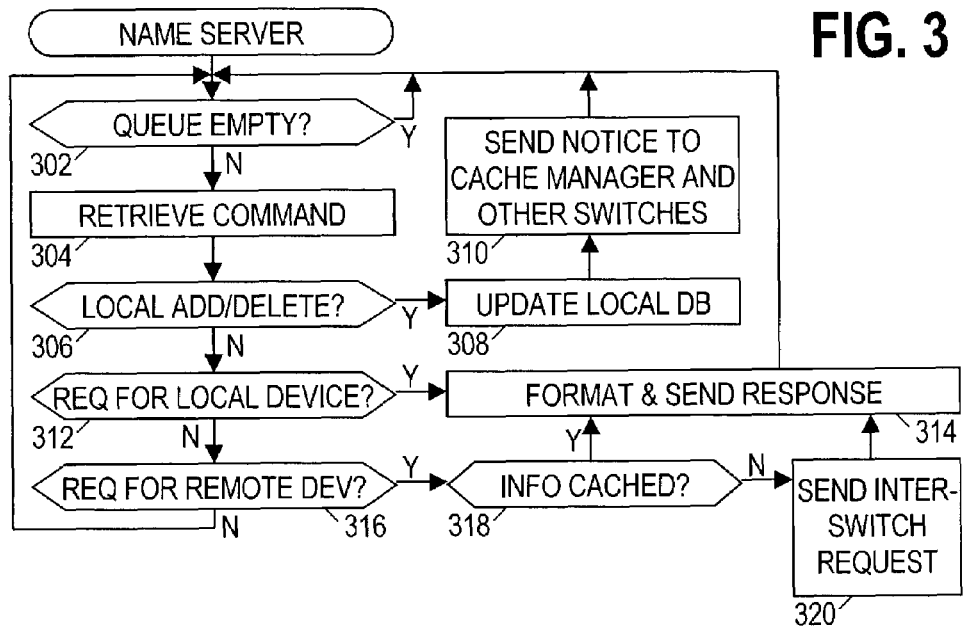
FIG. 3
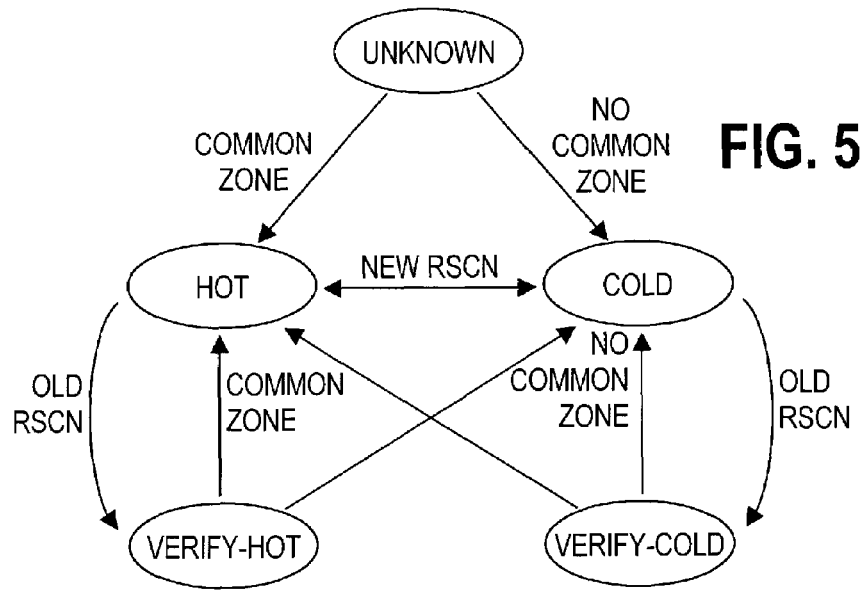
FIG. 5
| FIELD | BYTES |
|---|---|
| RSCN COMMAND CODE: 0x1B | 1 |
| RESERVED | 3 |
| FLAGS | 1 |
| AFFECTED Nx_PORT | 3 |
| DETECTION FUNCTION | 4 |
FIG. 6

FIG. 7

| FIELD | BYTES |
|---|---|
| RSCN COMMAND CODE: 0x1B | 1 |
| RESERVED | 3 |
| FLAGS | 1 |
| AFFECTED Nx_PORT | 3 |
| DETECTION FUNCTION | 4 |
| NUMBER OF DEVICES (M) | 4 |
| DEVICE ENTRY 1 | X |
| DEVICE ENTRY 2 | X |
| ... | ... |
| DEVICE ENTRY M | X |

FIG. 8

| FIELD | BYTES |
|---|---|
| FLAGS | 1 |
| PORT ID | 3 |
| PORT WWN | 8 |
| NODE WWN | 8 |

FIG. 9

| FIELD | BYTES |
|---|---|
| ENTRY OBJECT FORMAT | 1 |
| OWNER IDENTIFIER | 3 |
| PORT TYPE | 1 |
| PORT IDENTIFIER | 3 |
| PORT NAME | 8 |
| NODE NAME | 8 |
| INITIAL PROCESS ASSOC. | 8 |
| IP ADDRESS (NODE) | 16 |
| CLASS OF SERVICE | 4 |
| FC-4 TYPES | 32 |
| IP ADDRESS (PORT) | 16 |
| FABRIC PORT NAME | 8 |
| RESERVED | 1 |
| HARD ADDRESS | 3 |

FIG. 10

| FIELD | BYTES |
|---|---|
| FLAGS | 1 |
| HOST PORT ID FOR PHANTOM | 3 |

FIG. 11

| FIELD | BYTES |
|---|---|
| RSCN COMMAND CODE: 0x61 | 1 |
| PAGE LENGTH: 0x04 | 1 |
| PAYLOAD LENGTH | 2 |
| AFFECTED N_PORT ID P. 1 | 4 |
| AFFECTED N_PORT ID P. 2 | 4 |
| ... | ... |
| AFFECTED N_PORT ID P. M | 4 |

FIG. 12

| FIELD | BYTES |
|---|---|
| ADDRESS FORMAT | 1 |
| AFFECTED N_PORT ID | 3 |

CACHING REMOTE SWITCH INFORMATION IN A FIBRE CHANNEL SWITCH

CROSS-REFERENCE TO RELATED APPLICATIONS

The present application relates to co-pending US. patent application Ser. Nos. 10/208,376, 10/208,375, and 10/208,401, which are concurrently filed herewith. Ser. No. 10/208,376 is entitled "Fibre Channel Switch Having A Push/Pull Method For Caching Remote Switch Information," was invented by Richard L. Hammons et al., and was filed on Jul. 30, 2002. Ser. No. 10/208,375 is entitled "Fibre Channel Network Employing Registered State Change Notifications With Enhanced Payload," was invented by Xiaoheng Chen et al., and was filed on Jul. 30, 2002. Ser. No. 10/208,401 is entitled "Fibre Channel Switch That Aggregates Registered State Change Notifications," was invented by Raymond C. Tsai et al., and was filed on Jul. 30, 2002.

BACKGROUND

1. Field of the Invention

This invention generally relates to systems and methods for providing network communications between computers or computer system components. More specifically, this invention relates to increasing the scalability of Fibre Channel networks through the use of remote switch information caching in a Fibre Channel switch, through use of an improved name server structure, and through use of an extended registered state change notification (RSCN) packet payload.

2. Description of the Related Art

Networking of high-performance computers has become the focus of much attention in the data communications industry. Performance improvements in processors and peripherals, along with the move to distributed architectures such as client/server configurations, have spawned increasingly data-intensive and high-speed network applications, such as medical imaging, multimedia, and scientific visualization.

One protocol that has been developed to provide the necessary communications capacity is the Fibre Channel (FC) protocol. A single FC link can carry data at rates exceeding 1 gigabit per second (Gb/s) in both directions simultaneously. The FC protocol defines standard media and signaling conventions for transporting data in a serial fashion. It also provides an error correcting channel code and a frame structure for transporting the data. Further, the FC protocol sets out a buffer-credit-based flow control methodology, and creates some common services (e.g. fabric controller, name server). The FC protocol can be applied to various network topologies including point-to-point ring, and switched fabric. Further details regarding the FC protocol can be found online at www.fibrechannel.org.

FC networks can grow quite large. The protocol allows for nearly $2^{24}$ (over 16 million) node ports within a single fabric (a FC network includes one or more FC fabrics). Each node port supports one FC device. As larger networks are implemented (e.g., more than about eight switches), various unforeseen weaknesses in the FC protocol become evident. For example, the amount of network traffic necessary to support and use the name server grows as the square of the number of devices attached to the fabric, and this traffic can at times severely impair the performance of the network. It would be desirable to eliminate or mitigate the adverse effects of this traffic, thereby improving the speed, efficiency, and reliability of larger networks.

SUMMARY OF THE INVENTION

The problems outlined above are in large measure addressed by a Fibre Channel (FC) fabric having switches with a distributed name server configuration and caching of remote node device information. In one embodiment, the fabric comprises a first switch coupled to a second switch. Each of the switches are directly coupled to at least one node device. The first switch maintains a database of information about the node devices directly coupled to the first switch. The second switch maintains a database of information about the node devices directly coupled to the second switch, and further maintains a cache of information about node devices directly coupled to other switches. The first switch may also maintain a cache of information about node devices directly coupled to other switches. The database and cache are preferably maintained by independent components, a name server component and a cache manager component, respectively. The name server preferably notifies other switches of changes to the database, and the cache manager preferably uses the notifications from other switches to maintain the cache. The cache allows the name server to respond to requests for information about remote node devices without having to access the switch directly coupled to that node device (the "entry switch"). Each switch having cached information may advantageously reduce the burden on the entry switch, thereby improving network performance.

BRIEF DESCRIPTION OF THE DRAWINGS

A better understanding of the present invention can be obtained when the following detailed description is considered in conjunction with the following drawings, in which:

FIG. 3 is a flow chart of a preferred embodiment of a name server software task;

FIG. 5 is a state transition diagram preferably used by the cache manager component;

FIG. 6 shows the format of a "PID format" inter-switch registered state change notification (RSCN) packet;

FIG. 7 shows the format of a "Multiple Entry format" inter-switch RSCN packet;

FIG. 8 shows the format of a small entry in a multiple entry format inter-switch RSCN packet;

FIG. 9 shows the format of a preferred medium entry in a multiple entry format inter-switch RSCN packet;

FIG. 10 shows the format of a preferred entry for a phantom RSCN packet;

FIG. 11 shows the format of an node device RSCN packet; and

FIG. 12 shows the format of a page in the node device RSCN packet.

Figure 1:
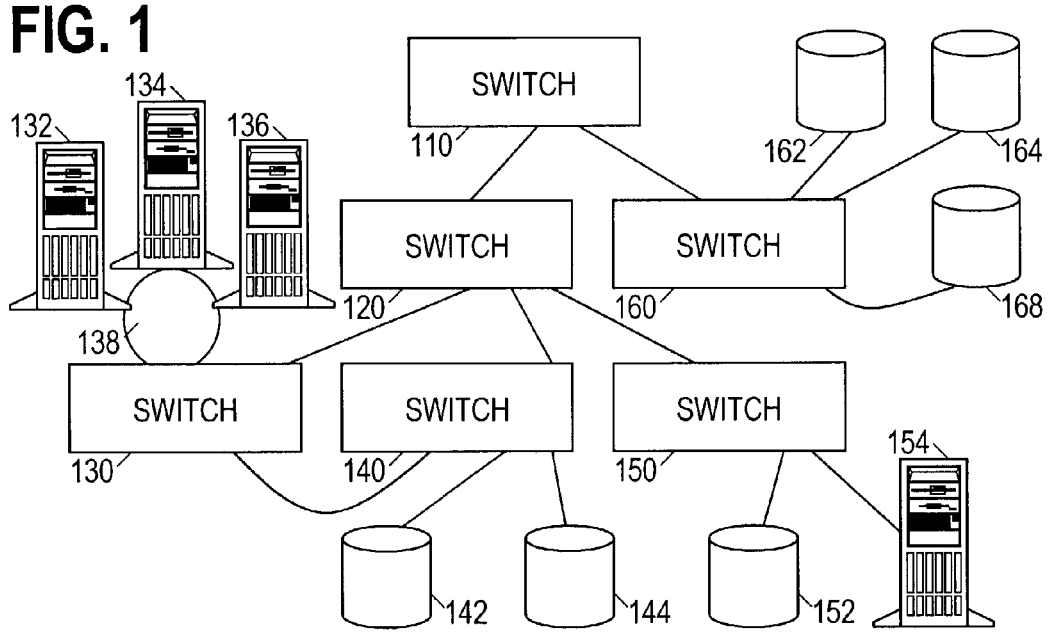
FIG. 1 is an illustrative Fibre Channel (FC) fabric.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the figures, FIG. 1 shows an illustrative Fibre Channel (FC) fabric having six interconnected switches 110, 120, 130, 140, 150 and 160. Switches 110 and 120 are not directly coupled to any FC node devices, while switches 130, 140, 150 and 160 are directly coupled to FC node devices. Switch 130 is coupled to three FC node devices 132-136 by an arbitrated loop 138. Switch 140 is directly coupled to two FC node devices 142 and 144. Switch 150 is directly coupled to FC node devices 152-154, and switch 160 is directly coupled to FC node devices 162-168.

Although not shown in FIG. 1, a FC fabric may also include phantom devices. A phantom device is a logical node device that may be created by a switch. One situation where a phantom device may be desirable is an arbitrated loop. Loop node devices 132-136 may be private devices, meaning that they are not configured to engage in communications outside the loop 138. The switch 130 allows external node devices (e.g. node device 154) to communicate with private node devices in the loop by creating a phantom node device on arbitrated loop 138 and making communications to and from the external node device appear like communications to and from the phantom device. For more on this, please refer to U.S. patent application Ser. No. 09/370,095, entitled "System and Method for Sending and Receiving Frames between a Public Device and a Private Device," filed Aug. 6, 1999, which is hereby incorporated by reference.

In addition to providing basic connectivity between FC node devices, the switches preferably provide additional FC fabric services such as fabric controller, directory server (also known as a "name server"), time server, management server, quality of service facilitator, and alias server. These services may be localized to an individual switch, or they may be distributed among the switches. The name server, in particular, is preferably distributed among the switches.

The distributed name server is preferably implemented as follows. Each switch contains a resident name server that is responsible for the FC node devices that are directly coupled to that switch. As the links between these devices and the switch are initialized, the resident name server constructs and updates a database of the relevant device properties. The resident name server also updates the database in response to events and commands from the devices. Because the switch contains a full database entry for the node devices directly coupled to it, the switch is often termed the "entry" switch for those devices.

Examples of node device properties stored in a full database entry may include the Port Identifier, the Port Name, the Node Name, the Class of Service, the Node IP Address, the Initial Process Associator, one or more FC-4 Types, a Symbolic Port Name, a Symbolic Node Name, a Port Type, a Port IP Address, the Fabric Port Name, the Hard Address, an FC-4 Descriptor, and a list of FC-4 Type Features. Further details on these properties and the name server objects that may be used to store these properties are available in the Fibre Channel GS-3 specification.

Node devices access the distributed name server by sending a name service request to the resident name server on the switch to which they are directly coupled, i.e. their entry switch. If the resident name server does not have the information available, the entry switch's resident name server services the request by making any needed requests from resident name servers on other switches. The subordinate requests are preferably transparent to the original requesting client.

Each of the node devices typically determines the properties of the other node devices with which it communicates. Upon connecting to the network, the node devices send a request addressed to the name server, which is then received by the resident name server on the entry switch. Typically, where such request forms are supported, the request takes the form of GE_PT (get entries of a given Port Type) or GE_FT (get entries of a given FC-4 Type). Where such forms are not supported, the request may take the form of GID_PT (get identifiers for ports of a given Port Type) or GID_FT (get identifiers for ports of a given FC-4 Type). Once the identifiers have been obtained, a series of GE_ID (get entry for a given identifier) requests may be used to obtain the corresponding entries. In either case, the effect is to cause the entry switch to request each of the other switches to send all name server database entries that satisfy the given criteria to the entry switch, which then forwards the entries to the requesting device. As the number of entries is generally proportional to the number of node devices, and each device typically generates such a request, the amount of traffic increases as the square of the number of node devices.

The situation is exacerbated when one considers that node devices are not static. Their status or properties may change, e.g., when disconnected or reprogrammed. The frequency of change is generally proportional to the number of node devices. Each time a node device experiences an event that affects their name server entry, a Registered State Change Notification (RSCN) message is sent to all the node devices in the same zone (or, at least, those node devices in the same zone that have registered to receive such messages). Each of those node devices typically responds immediately with a GE_ID request, forcing the entry switch of the affected device to contend with a sudden influx of name server traffic.

Figure 2:
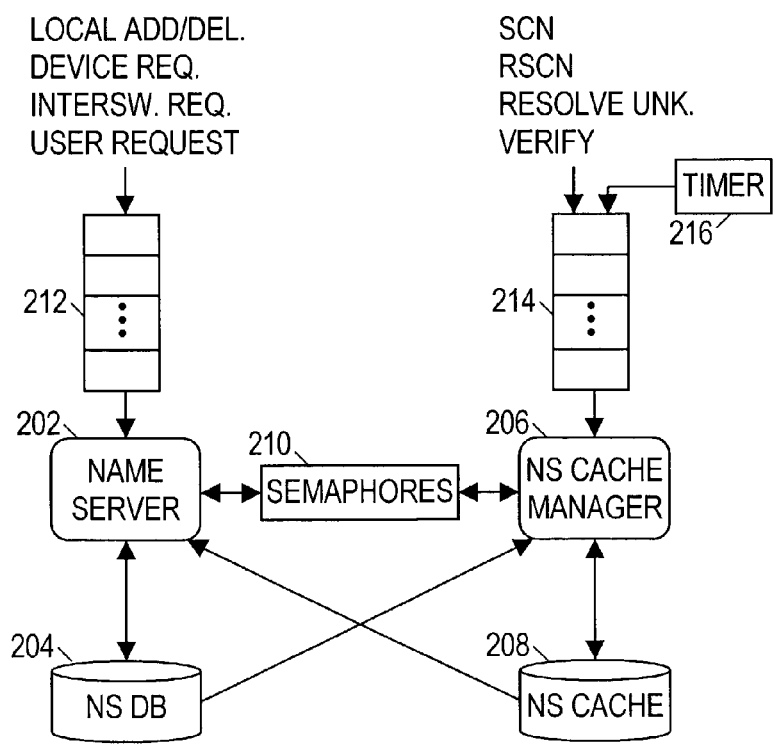
FIG. 2 is a preferred embodiment of a directory server on a switch.

To cope with this traffic, the preferred switch embodiment provides caching of remote switch information. FIG. 2 shows a functional block diagram of the preferred name server embodiment. In the preferred embodiment, the switch implements the distributed name server using two components: a resident name server 202, and a name server cache manager 206. The name server component 202 constructs and maintains the name server database 204 that stores the information for the directly-coupled node devices. The cache manager component 206 constructs and maintains a name server cache 208 that stores information for remote node devices. To coordinate access of the two components to the database and cache, the components 202, 206 preferably use a set of semaphores 210 as described further below. The name server component 202 preferably operates on event messages received via a name server queue 212, and the cache manager component 206 preferably operates on event messages received via a cache manager queue 214. Some of the event messages received via the cache manager queue 214 may be generated by a timer 216.

The components 202 and 206 preferably run continuously, operating on commands as they reach the head of the respective queue 212 and 214. Furthermore, they preferably run independently, with the name server component 202 preferably designated as a higher priority task that can service commands "immediately". The name server component is preferably designed to minimize delays for responses from other switches (i.e. switch-switch synchronous blocking). For the most part, the name server component 202 responds to device requests with whatever information is available at the time. To do this it may rely on both the name server database 204 and on the cache 208. Only in certain exception scenarios (e.g. the cache 208 does not contain the requested property of the node device) might it be necessary to query other switches to service a request.

The name server database 204 stores information (full name server entries) about local (i.e., directly-coupled) devices only. When local devices come online, they register with the name server component 202, causing an "add device" message to enter queue 212. The name server 202 preferably saves the device information in a simple linked list. Both the components 202 and 206 have read access to database 204, but only the name server component has the ability to write and make modifications to it. In essence, the name server component operates as the owner of the database 204. This may prove advantageous in the situation where a local device is added to the database 204 and the database is immediately queried about the newly added device. If the cache manager component 206 operated as database manager, a lag might exist between the "add device" message and the appearance of the new entry.

The cache manager component 206 is preferably designated as a lower priority task that operates in the background to maintain the cache 208. The cache 208 stores information about node devices directly coupled to switches other than this one, i.e., remote node devices. Preferably, the cache 208 stores information about all remote node devices in the fabric, although the cache entries may be limited to just the most commonly requested information about a device. In a preferred embodiment, both the components 202 and 206 have read access to the cache 208, but only the cache manager component 206 has the ability to write and make modifications to it. The cache manager component 206 is preferably designed to provide "fresh" information about the fabric's node devices in a reasonably timely fashion.

Note that the two components 202 and 206 are preferably able to operate independently. The semaphores 210 allow them to coordinate their accesses to the database 204 and cache 208 so that, e.g., the name server component 202 is not trying to read a cache entry that the cache manager component 206 is updating. The semaphores 210 accordingly provide one form of protection against data corruption.

In a preferred embodiment, there are at least two semaphores: a database semaphore, and a cache semaphore. Each semaphore is preferably a bit flag that indicates whether a resource is being used. A component that desires to access a resource checks the appropriate semaphore to determine if the resource is available, and if so, that component "takes" the semaphore by setting the flag to indicate that the resource is not available. Some hardware or software exclusion mechanism is provided to prevent both components from simultaneously taking the semaphore. Various semaphore implementations exist and may be used. Once the component is finished with the resource, the component sets the flag to indicate that the resource is available.

The use of two semaphores allows either of the components 202 or 206 to acquire one or both resources 204 and 208 if they are not in use by the other component. A component takes the appropriate semaphore to acquire a resource. To prevent blocking, the components 202 and 206 preferably comply with certain limitations. For example, if both semaphores are needed, the components follow a specific order when taking them; the cache semaphore is taken before the database semaphore. When the semaphores are released, they are released in reverse order (i.e., database semaphore before cache semaphore). Note that this forces a component that has acquired the database semaphore to release the database semaphore before it can take the cache semaphore. In a preferred embodiment, both semaphores must be released before an inter-switch call is made.

Additional semaphores may be desirable where there are other databases that may be accessed by one of the components. For example, if the name server component 202 occasionally needs to access a zoning database (e.g., for a zone check), a zoning semaphore may be included in semaphores 210. In the preferred embodiment, the semaphore order limitations are extended to require that the zoning semaphore be taken before either of the database semaphore and cache semaphore are taken. Further, the zoning semaphore is released only after the other semaphores are released.

Timer 216 generates one or more messages upon expiration of a corresponding timer, and sends the messages to queue 214. The timers are set by cache manager component 206 as explained with reference to FIG. 4 below. The cache manager 206 is preferably also designed to halt the timers when appropriate.

FIG. 3 shows a preferred high-level flowchart of the name server component 202. In block 302, the name server component 202 waits until a message is received in the name server queue 212. The name server component 202 retrieves a message from the queue 212 in block 304, and determines the message type in one of blocks 306, 312, and 316. If the name server component 202 determines in block 306 that the message is an add or delete message from a local node device, then the name server component updates the database 204 in block 308. In block 310, the name server component sends a registered state change notification (RSCN) to the cache manager component 206, other fabric services (such as the management server), and to other switches to notify them that a change has occurred. A reliable transport mechanism is preferably used to ensure delivery of the RSCN to the targets.

Note that RSCN messages are classified into two types: inter-switch RSCN messages, and node device RSCN messages. RSCN messages exchanged between switches are given an inter-switch format, but this format is different from the node device format used by (and expected by) node devices. Both formats are discussed herein. Another message type briefly mentioned herein is a state change notification (SCN) message. SCN messages are used to indicate changes in switch states, as opposed to changes in registered node device states.

A new inter-switch RSCN format with an expanded payload is proposed herein and described in greater detail below. Not all switches may support the new format, but it is generally possible for one switch to determine the capabilities of the other switches. For example, the one switch may query other switches to determine their manufacturer and firmware version. Switches having a particular manufacturer and revision number may be presumed to support the new format. If for some reason it is not possible to determine the capability of another switch, the name server can default to previous inter-switch RSCN formats when communicating with that switch. The name server component 202 preferably determines and uses the appropriate inter-switch RSCN format in block 310.

One inter-switch RSCN format is referred to herein as a "PID format RSCN". In this format, the inter-switch RSCN provides a bare notification of a change in the state of a given port using the port identifier (PID). The switch receiving the PID format RSCN must take further action (e.g., by querying the name server) if further information is needed. This format is widely supported.

A preferred inter-switch RSCN format is referred to herein as an "entry format RSCN". In this format, the inter-switch RSCN includes name server entries having information about the current state of one or more ports that have changed states. The entries are preferably not full name server entries, which can require over a kilobyte to express. Rather, the entries are preferably "medium" or "small" name server entries. Medium name server entries are preferably limited to commonly-requested device information, such as Owner Identifier, Port Type, Port Identifier, Port Name, Node Name, Initial Process Associator, Node IP Address, Class of Service, FC-4 Types, Port IP Address, Fabric Port Name, and Hard Address. A medium entry limited to such information might require only 112 bytes to express. The medium entry may be customized based on experience to include the optimal amount and type of device information, and to exclude the less useful or unnecessary type of device information.

Medium name server entries are preferably used in entry format RSCN messages when a node device comes on-line or changes state but remains on-line. Small name server entries are preferably used in entry format RSCN messages when a node device goes off-line. These are described below with reference to FIGS. 8 and 9.

A switch that supports the preferred inter-switch RSCN format can cache the device information, and may thereby avoid unnecessary querying of the originating switch or device. Accordingly, the entry format RSCN is preferably used by the name server component 202 in block 310 if the receiving switch supports this format.

If the name server component 202 determines in block 312 that the message is an information request about a local node device, then in block 314 the name server component retrieves the appropriate information from the local database and sends a response to the requester. If the name server component 202 determines in block 316 that the message is an information request about a remote node device, then in block 318 the name server component accesses the cache 208 to retrieve the requested information. If the remote node device is not cached, or if the particular requested information about the remote node device is not cached, then in block 320, the name server component sends an inter-switch request to obtain the requested information. Once the information has been retrieved from the cache or from another switch, the name server component 202 sends a response to the requester.

The name server component 202 cooperates with the cache manager component 206 to implement a push/pull caching model. The name server component 202 "pushes" information to caches on other switches in response to add/delete messages from local node devices. The cache manager 206 receives this information from other switches and supplements it by periodically requesting, or "pulling", information from the other switches. This model may advantageously combine the low-latency of a push model with the dependability of a pull model.

To make the "pulling" of cache information more efficient, the cache manager component 206 maintains records of all other switches in the fabric. The cache manager component 206 preferably further establishes one of five states for each switch (see FIG. 5): unknown, hot, cold, verify-hot, and verify-cold. When a switch is first identified, its state is "unknown". After complete local node device information is obtained from a switch, it is assigned either a hot or cold state. A remote switch is "hot" if it has at least one local node device that shares a zone membership with at least one local node device of the current switch; otherwise it is "cold".

If a PID format RSCN is received from a switch, the cache manager component 206 adjusts the state as follows. A switch in the unknown state remains unknown. A switch in the hot state is changed to a verify-hot state, indicating that it is still "hot", but the information regarding one or more node devices on that switch may be outdated. Similarly, a switch in the cold state is changed to a verify-cold state to indicate that the information regarding one or more devices may be outdated. Once the remote switch information is updated, the cache manager component 206 will adjust the switch state to hot or cold, based on the updated information.

If an entry format RSCN is received from a switch, the cache manager component 206 adjusts the state as follows. A switch in the unknown state remains unknown. A switch in the hot state is changed to cold if the information indicates that the remote switch no longer has a node device with a zone membership common to the node devices of the current switch. Otherwise, the switch remains hot. A switch in the cold state remains cold unless the received information indicates that such a common zone membership has been established.

Figure 4:
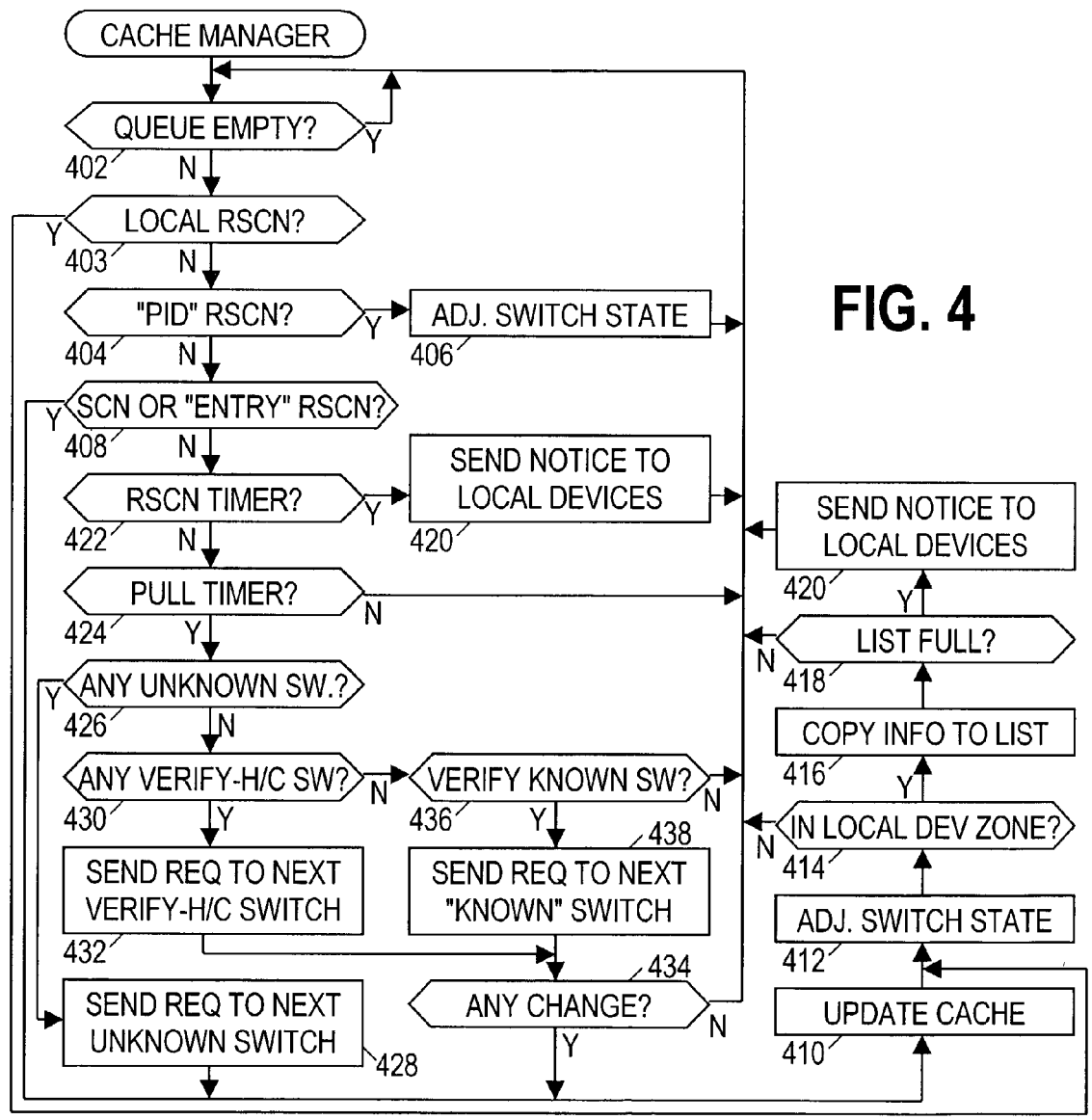
FIG. 4 is a flow chart of a preferred embodiment of a name server cache manager software task.

FIG. 4 shows a high-level flowchart of a preferred embodiment of cache manager component 206. In block 402, the cache manager 206 waits for a message to enter the queue 214. The cache manager component 206 then determines the message type in one of blocks 403, 404, 408, 422, or 424. If the cache manager component 206 determines in block 403 that the message is from a local node device, then in block 412 it adjusts the state of the each switch as described above.

In block 414, the cache manager component 206 determines which, if any, local node devices share a common zone membership with the affected remote node device(s). The identifiers for these remote node devices are placed into a list in block 416. If the list was previously empty, the cache manager component 206 starts an RSCN timer. If the cache manager component 206 determines in block 418 that the list is full (in a preferred embodiment, the list holds ten node device identifiers), it sends notice in block 420 to the local devices of the changes to the remote node devices in the list. The cache manager component 206 also preferably halts the RSCN timer in block 420.

The notice that the cache manager component 206 sends in block 420 is preferably in the form of a node device RSCN with multiple identifiers. The cache manager component 206 preferably sends to each local node device an RSCN with identifiers of only those node devices that share a common zone membership with that local node device. Of course, the cache manager component can exclude from the RSCN payload the identifier of the receiving local node device itself.

If the receiving local node device does not support RSCN messages with multiple identifiers, the cache manager component 206 preferably sends a sequence of single identifier RSCN messages to the local node device. The local node device can respond to the RSCN message(s) with queries to the name server component 202 to obtain the new information about the identified node devices.

If the cache manager component 206 determines in block 404 that the message is a PID format RSCN, it adjusts the switch state in block 406 as described above. The cache manager component 206 then returns to block 402.

If the cache manager component 206 determines in block 408 that the message is an entry format RSCN or a switch-generated state change notification (SCN), it updates the cache in block 410. For an entry format RSCN, this may simply involve copying node device information to the cache, or deleting node device information from the cache. For a SCN, this may involve adding a switch entry to the cache and assigning the appropriate state, or removing a switch entry from the cache along with all the associated node device entries.

When starting a list in block 416, the cache manager component 206 preferably sets the RSCN timer to about 500 milliseconds. This is expected to be an adequate aggregation time without being so long as to allow the RSCN information to grow stale. If the timer expires before the list is filled, a RSCN timer message passes through the queue and gets detected by the cache manager component in block 422. The cache manager then sends notice to the appropriate local node devices in block 420 as explained above.

In block 424, the cache manager component 206 checks to determine if the message is a pull message. Timer 216 preferably has a continuously running "pull" timer that periodically sends a pull message to queue 212. In a first embodiment, the pull timer is programmed to provide N pull messages every 10 seconds, where N is the number of switches in the system. This frequency allows the node devices to obtain a complete picture of the network within 10 seconds. In a second embodiment, the pull timer is programmed to provide a pull message every 500 milliseconds.

When the cache manager component 206 detects a pull message, it identifies an unknown switch in block 426 and sends a query to the unknown switch in block 428. The cache manager component 206 then updates the cache in block 410 as described previously. If the cache manager component determines in block 426 that there are no unknown switches left, then in block 430 the cache manager component identifies a verify-hot switch or verify-cold switch. In block 432 the cache manager component 206 sends an inquiry to the selected switch. The cache manager component 206 tests the information in block 434 to determine if it has changed, and if so, the cache manager component 206 adjusts the switch state accordingly in block 410.

Once all of the switches have been classified into the hot or cold states, the cache manager component begins counting pull messages in block 436. Every M pull messages, the cache manager component 206 identifies a known (i.e., hot or cold) switch to verify. The cache manager component 206 sends a query to the selected known switch in block 438, and tests the received information for any change in block 434. In the first embodiment, M is preferably about 30, which would cause every switch to be verified every 5 minutes or so. In the second embodiment, M is preferably about 100, which would cause verification of a known switch every 50 seconds or so. M may be chosen to be higher if less overhead traffic is desired and a longer verification interval can be tolerated.

The queries sent by the cache manager component 206 in response to the pull message preferably take the form of a Fibre Channel GE_PT query (of type Nx_Port) to retrieve all node devices on a remote switch. For early versions that do not support the GE_PT query, the cache manager component may send a GID_PT query to retrieve the identifiers for all node devices on the remote switch. The cache manager component 206 can then send a series of GE_ID queries to obtain device information for each node device identifier.

Below, a list of scenarios is provided, along with an explanation of the preferred sequence of events.

Local device comes online/new field registered.
a. Port puts message in queue 212.
b. Name server component 202 picks up message, registers device in local database 204, sends local RSCN to cache manager component and inter-switch RSCN with medium name server entry payload.
c. Cache manager component 206 receives RSCN.
d. If new device, cache manager component 206 goes through every switch entry in cache switch list:
  i. Switch entry HOT or COLD: cache manager component goes through each device in cold device list and zone checks to see if any are now hot. If so, these devices are added to the RSCN list and moved over to the hot list. If the switch was COLD, it is changed to HOT.
  ii. Switch entry UNKNOWN: do nothing.

Local device goes offline.
a. Port puts message in queue 212.
b. Name server component 202 picks up message, removes device from local database, sends local RSCN to cache manager component, inter-switch RSCN with small name server entry payload sent to other switches.
c. Cache manager component 206 receives RSCN.
d. Cache manager component checks if any local devices left. If not, all switch entries changed to COLD.
e. Cache manager component goes through each HOT switch entry in cache switch list:
  cache manager component goes through hot device list and zone-checks each against every local device. If some are now cold they are moved to the cold device list but no local RSCN is needed. If zero hot devices on switch, switch is changed to COLD.

Remote device comes online (if multiple device entries, go through each device):
a. RSCN received by cache manager component in its queue.
b. Cache manager component finds the switch entry pertaining to the domain the device is on.
c. If switch is UNKNOWN: do nothing
d. If switch is HOT or COLD:
  i. entry format RSCN, the device is zone-checked against all local devices. If zoned, the device is added to the RSCN list and added to the hot list and if the switch was COLD, it is changed to HOT. If the device is not zoned to a local device, the device is added to the cold list.
  ii. PID format RSCN, the switch is set to a verify state. When the appropriate timer expires a GE_PT is sent to that switch and item i. above is followed based on the GE_PT response.

Remote device goes offline.
a. RSCN received by cache manager component in its queue.
b. Cache manager component finds the switch entry pertaining to the domain the device is on. Depending on the state:
  i. UNKNOWN: do nothing
  ii. HOT or COLD: remove from device list. If last device on hot list, state goes to COLD
c. If any hot devices become cold, device is added to the RSCN list.

Remote switch comes online.
a. SCN received by cache manager component in its queue.
b. Cache manager component creates switch entry and sorts it in its switch entry list
c. Revision for switch is retrieved and stored.
d. Switch entry state is marked UNKNOWN Remote switch goes offline.
a. SCN received by cache manager component in its queue.
b. Cache manager determines if offline switch had node devices that share common zone membership with local devices, and if so, adds remote device identifiers to RSCN list.
c. Cache manager component removes switch entry from switch entry list.

Zone Change.
a. Cache manager component goes through each HOT/COLD switch entry and zone-checks against local devices. Move devices to the appropriate list if they are in the wrong list, and change switch states to HOT/COLD appropriately.

b. Cache manager component adds devices changing zones to RSCN list.

We now turn to a detailed description of RSCN formats. FIG. 6 shows a PID format RSCN, which serves to simply notify a switch of a state change to the fabric, a given switch, or a given node device. The first field of this RSCN format is a one-byte message code value that identifies the message as an inter-switch RSCN. The next field is a 3-byte reserved field. The third field is a one-byte field for flags. The fourth field is a three-byte field for the port identifier of the affected object, i.e. the fabric, switch or node device that changed state. The last field is a four-byte field for the detection function. The value of this field indicates whether the state change was detected by a node device or by a switch.

In a preferred implementation, the first two bits (bits <7:6>) of the flag field are used to indicate the RSCN format; 00 indicates a PID format, and 01 indicates an entry format RSCN. The next two bits (bits <5:4>) are used to provide information about the port state; 00 indicates nothing, 01 indicates that the port is online, 10 indicates that the port is offline, and 11 indicates that the port is a private loop with a phantom device (described further below). The remaining four bits (bits <3:0>) indicate the format of the ensuing port identifier: 00 indicates a port address format, meaning that all identifier bits are significant; 01 indicates area address format, meaning that only the first 16 bits of the identifier are significant; 10 indicates a domain address format, meaning that only the first 8 bits are significant; and 11 indicates a fabric address format, meaning that none of the identifier bits are significant.

FIG. 7 shows an entry format RSCN, which serves to carry cache information to a switch. The first five fields are the same as those of the PID format RSCN. The fifth field is a four-byte field to indicate the number of device entries in the RSCN payload. The fifth field is followed by a list of device entries, which includes the number of entries specified in the fifth field. The entries may either be small entries as discussed below with reference to FIG. 8, medium entries as discussed below with reference to FIG. 9, or phantom device entries as discussed below with reference to FIG. 10.

FIG. 8 shows a "small" device entry, which may be preferably used in entry format RSCNs when a node device goes offline (as indicated in the flag byte). The small device entry contains three fields that occupy 20 bytes. The first entry field is four-byte field for the port identifier, which identifies the port connected to the affected node device. The second entry field is an eight-byte field for the unique "world-wide" name of the port, and the third entry field is an eight-byte field for the unique name of the node device.

FIG. 9 shows a preferred "medium" device entry, which may be used in entry format RSCNs when a node device goes online or changes state but remains online. The medium device entry contains fourteen fields that occupy a total of 112 bytes. The first field is a one-byte field for indicating the format of the entry, in this case, a "medium" format. Different values may indicate different collections of device properties in the entry. Different causes of RSCN messages could thus trigger the use of different entry formats. For the preferred implementation, however, just one medium format is used.

The second entry field is a three byte field for identifying the switch that "owns" the full name server entry, i.e. the entry switch of the node device. The third field is a one-byte field that indicates the Port Type, and it is followed by a three-byte field for the port identifier (PID) of the node device. The fifth and sixth fields are eight-byte fields for the unique names of the port and node device, respectively. The next field is an eight-byte field for identifying the Initial Process Associator of the node device. The eighth field is a sixteen-byte field for the Internet Protocol (IP) address of the node device. The ninth field is a four-byte field for specifying the Class of Service expected by the node device. This is followed by a 32-byte field for specifying FC-4 Types (for higher level protocols using FC as a transport means). The eleventh field is a sixteen-byte field for the IP address of the port. The twelfth field is an eight-byte field for the Fabric Port Name. The thirteenth field is a one-byte reserved field, and the last field is a three-byte field for the hard (physical) address of the node device.

FIG. 10 shows a preferred device entry for a phantom device. In the discussion of FIG. 1, it was noted that phantom devices are useful for arbitrated loops with private node devices. Arbitrated loops engage in a loop initialization primitive (LIP) process when a loop node device changes state. The phantom device (in reality, the switch that emulates the phantom device) notifies the external node device associated with the phantom device of any such LIP process with an RSCN. The RSCN is preferably in entry format, and the entry is preferably a four-byte entry as shown in FIG. 10. The first field is a one-byte flag field, and the second field is a three-byte field for the port identifier of the external node device associated with the phantom device.

FIG. 11 shows a node device RSCN which serves to notify a node device of state changes to other identified node devices. The first field is a one-byte command field used to indicate that the message is a node device RSCN. The second field is a one byte field for indicating the length of each page in the payload. It is preferably set to indicate a four-byte page length. The third field is a payload length field used to indicate the number of bytes in the payload (i.e., the number of payload pages times the length of each page). The third field is followed by a series of one or more pages. FIG. 12 shows a typical four-byte page. The first field is a one byte field that indicates the address format (port, area, domain, or fabric) of the following port identifier. The second field is a three-byte field that contains the port identifier. When supported, the node device RSCN preferably includes multiple port identifiers aggregated as explained previously. The aggregation preferably takes the form of multiple pages, but in an alternative embodiment, the aggregation may take the form of adjusting the address format to cover all ports that have changed. Thus, for example, an area format identifier may be used to indicate that multiple node devices have changed states in an arbitrated loop.

Several scenarios are provided below to illustrate when RSCN messages are generated and delivered.

Device comes online/offline. This is the most common case for generating an RSCN with a port or area address identifier. The RSCN is delivered to all the switches in the fabric. Any node device in the fabric that is zoned with node device coming online/offline, and that has registered to receive fabric-detected state changes, should receive a node device RSCN regarding the online/offline node device.

Private loop with phantom device performs LIP process. In this case, a "phantom" RSCN for the phantom device will be delivered to all the switches in the fabric, but only the host node device (i.e. the external node device associated with the phantom device) will receive an RSCN if the host node device has registered to receive fabric-detected state changes. The RSCN will be a node device RSCN with an area address identifier.

Zoning changes. No inter-switch RSCN is generated. The cache manager components will receive CFG_CHANGED SCN for this event, and will generate node device RSCNs (with a fabric address identifier) for those devices that have registered to receive fabric-detected state changes.

Switch IP address changes or switch name changes. Inter-switch RSCNs with a domain address identifier will be generated and delivered to all the switches in the fabric. All the devices registered to receive fabric-detected state changes will receive a node device RSCN with a domain address identifier.

A remote switch becomes inaccessible. No inter-switch RSCN is generated. Cache manager components will receive DOMAIN_UNREACHABLE SCN for this event, and will provide node device RSCNs with domain address identifiers to those local node devices that are zoned with devices on the inaccessible remote switch and registered to receive fabric-detected state changes.

Node device sends RSCN. This is called port detected RSCN. Inter-switch versions of this RSCN will be delivered to all the switches in the fabric. Any node device in the fabric that is zoned with the originating node device and registered to receive port-detected state changes will receive a node device RSCN. The RSCN may be a node device RSCN with port or area address identifiers.

The preferred name server design outlined herein may advantageously provide backward-compatibility with older versions of FC fabric operating systems. The design is expected to be robust and reliable, and to generate less name server related traffic on average than previous designs. Further, the switches operate to distribute the traffic in time, thereby minimizing peak traffic loading on the fabric.

The proposed RSCN messages may take the physical form of modulated carrier signals traveling over fabric links. The carrier signals may be modulated into a sequential series of signal frames, each having a start of frame segment, a frame header, a content segment, and an end of frame segment. The field formats shown in the figures would describe the arrangement of information in the content segment following the frame header. The appropriate signaling protocols can be found in the Fibre Channel Framing and Signaling Draft Standard Rev. 1.70, published Feb. 8, 2002, and the Fibre Channel Physical and Signaling Interface, Rev. 4.3, published Jun. 4, 1994, both of which are hereby incorporated herein by reference.

Numerous variations and modifications will become apparent to those skilled in the art once the above disclosure is fully appreciated. It is intended that the following claims be interpreted to embrace all such variations and modifications.

What is claimed is:

1. A Fibre Channel (FC) fabric that comprises:
a first FC switch configured to directly couple with at least one FC node device, wherein the first FC switch executes a name server that maintains a first database of information about FC node devices directly coupled to the first FC switch; and
a second FC switch coupled to the first FC switch and configured to directly couple with at least one FC node device, wherein the second FC switch is configured to execute a name server that maintains a second database of information about FC node devices directly coupled to the second FC switch,
wherein the second FC switch is further configured to execute a cache manager that maintains a third database of information about FC node devices directly coupled to the first FC switch.

2. The fabric of claim 1, wherein the first FC switch further executes a cache manager that maintains a database of information about FC node devices directly coupled to the second FC switch.

3. The fabric of claim 1, wherein the name server executed by the first FC switch is configured to notify all other switches in the fabric of detected changes to FC node devices directly coupled to the first switch.

4. The fabric of claim 1, wherein the name server executed by the second FC switch is configured to notify the cache manager and all other switches in the fabric of detected changes to FC node devices directly coupled to the second switch.

5. The fabric of claim 4, wherein the cache manager is configured to receive notifications of detected changes from other switches and to update the third database accordingly.

6. The fabric of claim 5, wherein the cache manager is further configured to receive notifications of detected changes from the name server executed by the second switch.

7. The fabric of claim 6, wherein the cache manager is further configured to generate notification messages for FC node devices directly connected to the second FC switch, and wherein the notification messages include information from multiple notifications received by the cache manager.

8. The fabric of claim 6, wherein the cache manager is further configured to generate notification messages for FC node devices directly connected to the second FC switch, and wherein the notification messages represent all notifications received by the cache manager within a predetermined time interval.

9. The fabric of claim 6, wherein the cache manager is further configured to generate notification messages for FC node devices directly connected to the second FC switch, and wherein the notification messages include information from a predetermined number of notifications received by the cache manager, wherein said predetermined number is greater than one.

10. A Fibre Channel network that comprises:
multiple switches coupled together; and
multiple node devices, each directly coupled to at least one switch,
wherein each one of the multiple switches is configured with a name server component configured to respond to requests for information about node devices, and a cache manager component configured to maintain a cache of information about all node devices in the network that are not directly coupled to said one of the multiple switches.

11. The network of claim 10, wherein the cache comprises device entries that include information regarding only a predetermined subset of node device properties.

12. The network of claim 11, wherein the name server component maintains a local database of information about all node devices directly coupled to said one of the multiple switches, and wherein the local database comprises device entries that include information regarding a complete set of node device properties.

13. The network of claim 10, wherein the cache manager component receives information regarding a given node device each time a state change notification is issued for the given node device.

14. The network of claim 13, wherein the cache manager component notifies one or more node devices directly coupled to said one of the multiple switches after receiving information indicating a state change to a node device that shares a common zone membership with the one or more node devices.

15. The network of claim 14, wherein the cache manager component includes information about multiple node devices in notification messages to directly-coupled node devices.

16. A Fibre Channel switch that comprises:
- a name server component configured to respond to name server requests for information about node devices, and further configured to generate notification messages about changes to local node devices;
- a name server cache manager component configured to maintain a cache of node device entries that includes a node device entry for each node device that is directly coupled to any other switch in a network, wherein the name server component is configured to access the cache to respond to name server requests for information about node devices not directly coupled to the switch.

17. The switch of claim 16, wherein the name server component maintains a local database of node device entries that includes a node device entry for each node device that is directly coupled to the switch.

18. The switch of claim 17, wherein the node device entries in the cache include information regarding only a subset of device properties described in node entries of the local database.

19. The switch of claim 16, wherein the cache manager component receives information regarding a given node device each time a state change notification is issued for the given node device.

20. The switch of claim 19, wherein the cache manager component notifies one or more node devices directly coupled to the switch after receiving information regarding a state change to a node device that shares a common zone membership with the one or more node devices.

21. The switch of claim 20, wherein the cache manager component provides information about multiple node devices in notification messages to the directly-coupled node devices.

22. A method of providing information about node devices in a Fibre Channel network, the method comprising:
- receiving, at a switch, add messages and delete messages from local node devices directly coupled to the switch;
- using, at a switch, the add messages and delete messages to establish and maintain a database of local node device entries;
- receiving, at a switch, state change notification messages from other switches;
- using, at a switch, the state change notification messages to establish and maintain a cache of remote node device entries, wherein remote node devices are not directly coupled to the switch;
- receiving, at a switch, a node device information request;
- generating, at a switch, a response from the database of local node entries if the node device information request regards a local node device; and
- generating, at a switch, a response from the cache of remote node device entries if the node device information request regards a remote node device.

23. The method of claim 22, wherein the local node entries describe a predetermined set of node device properties, and wherein the remote node entries describe a subset of the predetermined set.

24. The method of claim 22, further comprising:
- generating, at the switch, a registered state change notifications for local devices after receiving a registered state change notification from another switch.

25. The method of claim 24, wherein the registered state change notification for a local device includes information from multiple registered state change notifications from other switches.

* * * * *